(12) United States Patent
Oster

(10) Patent No.: US 11,277,200 B2
(45) Date of Patent: Mar. 15, 2022

(54) SYSTEM AND METHOD FOR ESTIMATING A POINTING ERROR OF A SATELLITE ANTENNA

(71) Applicant: THALES, Courbevoie (FR)

(72) Inventor: Yann Oster, Toulouse (FR)

(73) Assignee: THALES, Courbevoie (FR)

( * ) Notice: Subject to any disclaimer, the term of this patent is extended or adjusted under 35 U.S.C. 154(b) by 245 days.

(21) Appl. No.: 16/826,207

(22) Filed: Mar. 21, 2020

(65) Prior Publication Data
US 2020/0313757 A1  Oct. 1, 2020

(30) Foreign Application Priority Data
Mar. 28, 2019  (FR) ...................................... 1903183

(51) Int. Cl.
*H04B 7/185*  (2006.01)
*H01Q 3/02*  (2006.01)
(Continued)

(52) U.S. Cl.
CPC ........... *H04B 7/18519* (2013.01); *H01Q 3/02* (2013.01); *B64G 1/66* (2013.01); *H01Q 1/288* (2013.01)

(58) Field of Classification Search
CPC ................................................ H04B 7/18519
See application file for complete search history.

(56) References Cited

U.S. PATENT DOCUMENTS 4,663,631 A * 5/1987 Brilman .................. G01S 3/325
342/422
5,677,696 A * 10/1997 Silverstein ............. H01Q 3/267
342/165
(Continued)

FOREIGN PATENT DOCUMENTS

EP  0 998 063 A2  5/2000

*Primary Examiner* — Hsinchun Liao
(74) *Attorney, Agent, or Firm* — BakerHostetler

(57) ABSTRACT

A system for estimating a pointing error of an antenna (ANT) of a satellite, the satellite includes a payload (CU) comprising a multichannel transmitter or receiver comprising a multichannel antenna (ANT), one analogue processing chain per channel and a set of digital integrated circuits (PN), the system comprising an estimation device (EST), implemented aboard the satellite or in a ground station, for estimating a pointing error of the antenna, the device for estimating a pointing error being configured to: acquire, for at least two channels of the transmitter or of the receiver, at least two test signals, each test signal having been transmitted or received by the antenna along a different direction ($\theta_A$, $\theta_B$), for at least one pair of acquired test signals, determine, for each test signal, a relative complex gain between the test signal received or transmitted respectively on two distinct channels, determine a comparative measurement between the two test signals from either the ratio between the two relative complex gains and/or the difference between the phases of the two relative complex gains, determine a pointing error ($d\theta$) of the antenna on the basis of the comparative measurement, of the expected directions of transmission or of reception of the test signals ($\theta_A$, $\theta_B$) and of a model of the gain of the antenna for each channel and in a plurality of directions.

12 Claims, 4 Drawing Sheets

(51) Int. Cl.
*H01Q 1/28* (2006.01)
*B64G 1/66* (2006.01)

(56) References Cited

U.S. PATENT DOCUMENTS

| | | | |
|---|---|---|---|
| 5,790,071 A | 8/1998 | Silverstein et al. | |
| 8,427,368 B1* | 4/2013 | Freedman | H04B 7/18519 |
| | | | 342/358 |
| 10,211,508 B2* | 2/2019 | Merrell | H01Q 3/08 |
| 10,284,286 B2* | 5/2019 | Grant | H04W 72/082 |
| 2014/0022120 A1 | 1/2014 | Mendelsohn et al. | |
| 2017/0288753 A1* | 10/2017 | Vasavada | H04B 7/185 |
| 2018/0205147 A1* | 7/2018 | Yao | H04B 7/18519 |

\* cited by examiner

SYSTEM AND METHOD FOR ESTIMATING A POINTING ERROR OF A SATELLITE ANTENNA

CROSS-REFERENCE TO RELATED APPLICATIONS

This application claims priority to foreign French patent application No. FR 1903183, filed on Mar. 28, 2019, the disclosure of which is incorporated by reference in its entirety.

FIELD OF THE INVENTION

The invention relates to the field of satellite communication systems and more precisely that of active antennas installed on board a satellite and operating in transmission mode or in reception mode.

The invention pertains to a system and a method for estimating a pointing error of a satellite antenna.

BACKGROUND

The invention proposes a solution to the problem of the precise determination of the pointing error of an active antenna aboard a satellite, in particular, but not solely, in the case of antennas with reflector.

The pointing error of an antenna corresponds to the difference between the direction of sighting of the antenna which is controlled mechanically and the actual direction. In practice, a disparity may exist between the desired direction and the actual direction notably on account of the thermoelastic deformation of the mechanical links of the antenna, of the dynamic deformation of the satellite and of its angular stability or of imperfect attitude.

Indeed, the direction of pointing of the antenna is determined in a reference frame tied to the satellite, on the basis of the attitude of the satellite. However, the determination and maintenance of the attitude of the satellite is possible only with a non-zero error margin, typically of the order of 0.1° over a day. This error carries over to the pointing precision of the antenna, thereby impacting the direction of arrival of the signals received or transmitted by the antenna of the satellite, relatively and respectively to a reference frame of the antenna or to a reference frame on the ground.

This lack of precision may be harmful for certain applications. Notably, when one wishes to carry out a precise calibration of the various processing channels of a payload, the direction of pointing of the antenna must be known precisely.

Moreover, in the case of multibeam antennas which illuminate spots of restricted size, a need also exists to finely control the pointing of the antenna so as to ensure the stability of the antenna coverage.

Various solutions exist for precisely estimating the pointing error of a satellite antenna.

A first solution consists in equipping the antenna with a so-called "RF sensing" system dedicated to the measurement of pointing consisting of a small number of sources, or indeed with a specific antenna, and with electronic processing equipment. This system must be mechanically coupled to the antenna.

A drawback of this solution is that it involves an increase in the mass and the consumption of the satellite. It also makes it necessary to ensure that the additional sources do not disturb the behaviour of the antenna. The consequences in terms of bulkiness, mass and consumption may turn out to be non-negligible.

A second solution consists in neglecting the thermoelastic effects on the mechanical links of the antenna. The pointing of the antenna is then estimated on the basis of the satellite's attitude, which is estimated with optical sensors (of the "star tracker" type) carrying out measurements on stars. This solution although economical does not make it possible to obtain the expected precision in the pointing of the antenna.

A third solution consists, in the case of an antenna in reception mode, in transmitting several signals from various ground stations at various geographical positions, on known frequencies, and then in carrying out, in the digital processor of the payload, the coherent acquisition of the signals arising from the various radiofrequency chains downstream of the antenna. On the basis of the sequences digitized over the set of channels, it is possible to implement an algorithm of MUSIC type, based on an estimation of the correlation matrix of the signals and a noise/signal eigen sub-space decomposition. This makes it possible to estimate the directions of arrival of the signals transmitted by the ground stations.

However, this technique is known to be very sensitive to an unfavourable signal-to-noise ratio and above all to the imperfections in terms of delay, phase and gain of the radiofrequency chains.

Moreover, this procedure is difficult to apply for an antenna in transmission mode, since it is necessary to distinguish the signals transmitted by the diverse radiating elements of the antenna, transmitted simultaneously, within the signal received on the ground, so as to construct a correlation matrix. The separation of the signals degrades the precision of the measurements in the case of a large number of radiating elements transmitting simultaneously.

SUMMARY OF THE INVENTION

The invention proposes a novel solution to the problem of estimating the pointing error of an antenna in reception mode or in transmission mode.

It is based on employing at least two ground stations transmitting or receiving a test signal along two different directions. The signal is processed on board or on the ground so as to precisely determine the direction of pointing of the antenna on the basis of a model of the gain of the antenna in various directions.

The proposed solution makes it possible to improve the precision of the estimation of the pointing of the antenna, without requiring any specific means on board the satellite impacting mass and consumption. The precision obtained is independent of the dispersions between analogue radiofrequency chains of the payload. It is also independent of the variations of the propagation conditions between the signals transmitted by the various ground stations and of the dispersions of the analogue radiofrequency chains of the ground stations. Also, the solution has no impact on the service rendered by the satellite. It allows regular or indeed continuous estimation of the antenna mispointing. The level of precision of the estimation can be further improved by utilizing more ground stations or various frequencies or else several reception/transmission channels aboard the satellite.

The subject of the invention is a system for estimating a pointing error of an antenna of a satellite, the satellite comprising a payload comprising a multichannel transmitter or receiver comprising a multichannel antenna, one analogue processing chain per channel and a set of digital integrated circuits, the system comprising an estimation device, implemented aboard the satellite or in a ground station, for estimating a pointing error of the antenna, the device for estimating a pointing error being configured to:

acquire, for at least two channels of the transmitter or of the receiver, at least two test signals, each test signal having been transmitted or received by the antenna along a different direction from the viewpoint of the satellite, for at least one pair of acquired test signals, determine, for each test signal, a relative complex gain between the test signal received or transmitted respectively on two distinct channels, determine a comparative measurement between the two test signals from either the ratio between the two relative complex gains and/or the difference between the phases of the two relative complex gains, determine a pointing error of the antenna on the basis of the comparative measurement, of the expected directions of transmission or of reception of the test signals and of a model of the gain of the antenna for each channel and in a plurality of directions.

According to a particular aspect of the invention, each test signal is composed of at least one spectral line.

According to a particular aspect of the invention, the device for estimating a pointing error is configured to determine a plurality of estimates of a pointing error on the basis of several pairs of test signals transmitted or received in different directions or several different pairs of distinct channels or several frequencies of test signals.

According to a particular aspect of the invention, the device for estimating a pointing error is configured to determine a pointing error of the antenna by:

determining, on the basis of the model of the gain of the antenna, a model of comparative measurement between the two test signals, dependent on a pointing error of the antenna, on the frequency and on the directions of transmission or of reception of the test signals ($\theta_A$, $\theta_B$), searching for the value of the pointing error which makes it possible to minimize the difference between the comparative measurement and the comparative measurement model taken at this value.

According to a particular aspect of the invention, the payload comprises a multichannel receiver and the device for estimating a pointing error is configured to receive, for at least two reception channels, a digitized temporal sample sequence of at least two test signals, the temporal sample sequence being tapped off simultaneously from the various channels in the set of digital integrated circuits.

According to a particular aspect of the invention, the system for estimating a pointing error furthermore comprises at least two test ground stations, each test ground station being configured to transmit a test signal towards the satellite.

According to a particular aspect of the invention, each test ground station is configured to transmit the test signals in turn on one and the same frequency or simultaneously on frequencies which are sufficiently close to be affected by the same errors.

According to a particular aspect of the invention, the payload comprises a multichannel transmitter, the device for estimating a pointing error being implemented in a ground station, each test signal received by a different ground station being transmitted by the antenna along a different direction of transmission from the viewpoint of the satellite.

According to a particular aspect of the invention, the system for estimating a pointing error furthermore comprises at least two test ground stations, each test ground station being configured to:

receive a test signal transmitted by the satellite along a different direction from the viewpoint of the satellite, separate the test signal received on the ground into several signals corresponding to the transmission channels of the satellite, dispatch, to the device for estimating a pointing error, the test signals received for at least two distinct transmission channels.

According to a particular aspect of the invention, the system is configured to apply a procedure for multiple access to the test signals transmitted by the satellite.

The subject of the invention is also a method for estimating a pointing error of an antenna of a satellite, the satellite comprising a payload comprising a multichannel transmitter or receiver comprising a multichannel antenna, one analogue processing chain per channel and a set of digital integrated circuits, the method comprising the steps of:

acquiring, for at least two channels of the transmitter or of the receiver, at least two test signals, each test signal having been transmitted or received by the antenna along a different direction, for at least one pair of acquired test signals, determining, for each test signal, a relative complex gain between the test signal received or transmitted respectively on two distinct channels, determining a comparative measurement between the two test signals from among the ratio between the two relative complex gains and/or the difference between the phases of the two relative complex gains, determining a pointing error of the antenna on the basis of the comparative measurement, of the expected directions of transmission or of reception of the test signals and of a model of the gain of the antenna for each channel and in a plurality of directions.

According to a variant, the method according to the invention furthermore comprises a step of correcting the pointing of the antenna on the basis of the pointing error.

DETAILED DESCRIPTION

Figure 1:
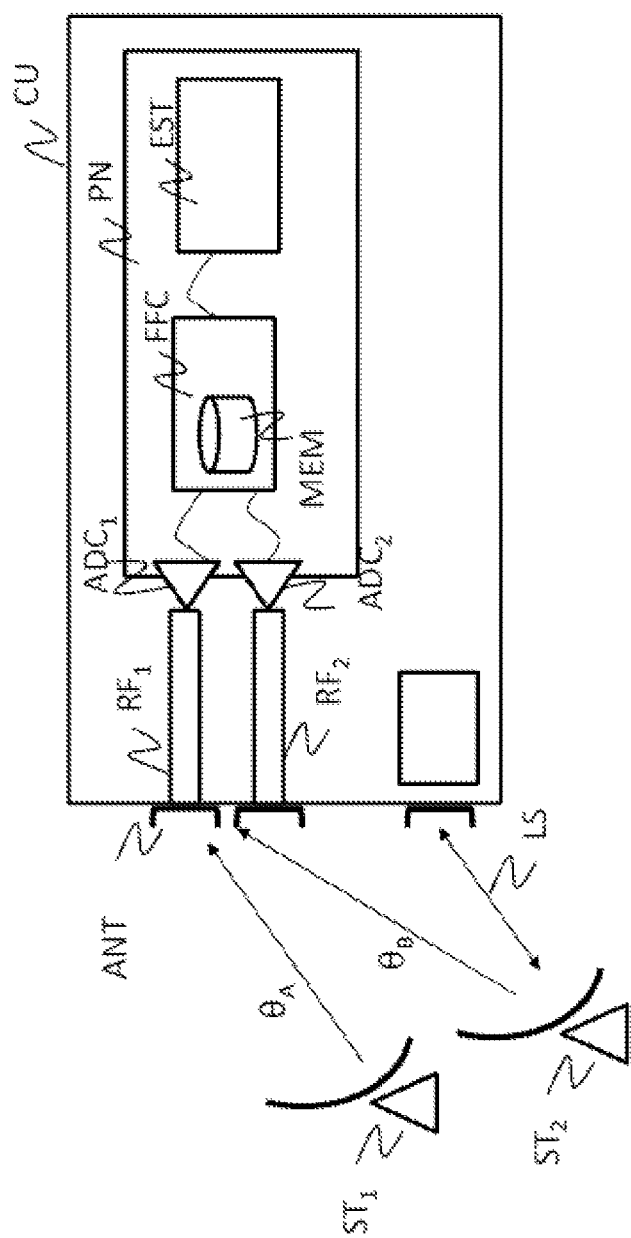
FIG. 1 represents a diagram of a system for estimating a pointing error of an antenna of a satellite operating in reception mode according to a first embodiment of the invention.
Figure 2:
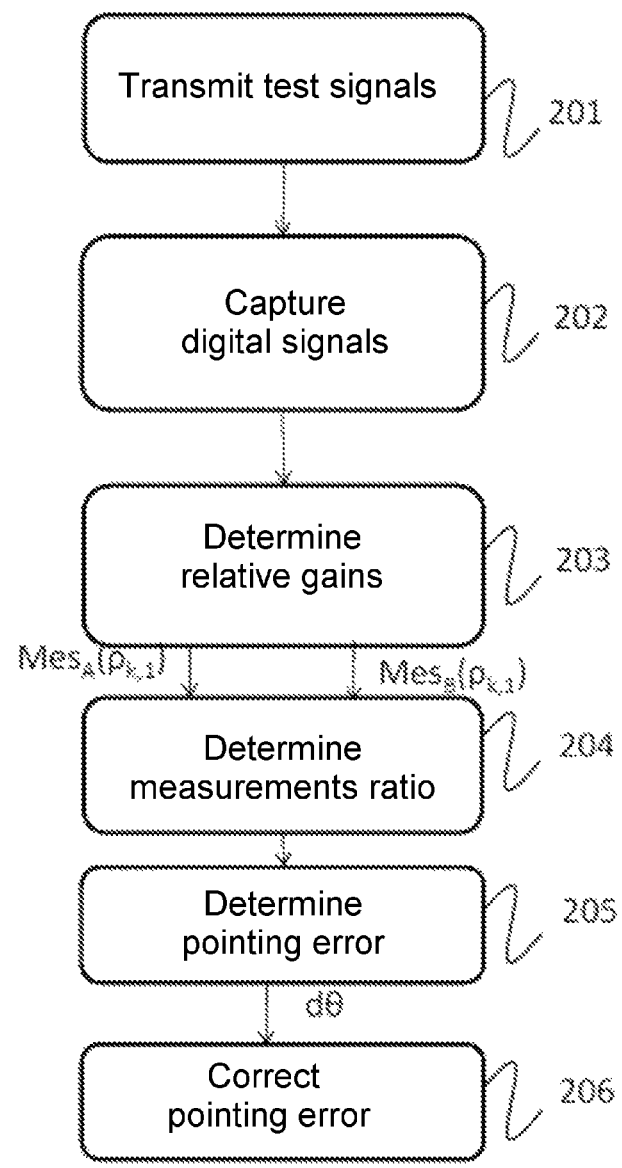
FIG. 2 represents a flowchart detailing the steps of carrying out a method for estimating a pointing error with the aid of the system of FIG. 1.

FIGS. 1 and 2 illustrate the implementation of a system and of a method for estimating the pointing error of an antenna of a satellite, in reception mode.

The system described in FIG. 1 comprises a payload CU of a satellite in orbit and at least two ground stations $ST_1$, $ST_2$.

Each ground station $ST_1$, $ST_2$ comprises notably an antenna pointed towards the satellite, a transmission chain for communicating with the satellite and a digital-to-analogue converter. In the case where the method according to the invention is implemented on the ground, at least one ground station $ST_2$ or some other remote equipment interfaced with the ground station $ST_2$ comprises a reception chain, an analogue-to-digital converter, a means of communication with the satellite via a secure link LS, a memory for storing the digitized signal received and a computation device for processing the signal. The link LS is made secure, for example by employing an error protection mechanism of the error-correcting code type.

The payload CU comprises one or more antenna(s) ANT or antenna array consisting of several radiating elements. Each radiating element receives a signal which is processed in the payload CU by a processing channel. The payload CU thus exhibits multichannel operation. A channel corresponds to a radiating element of the antenna ANT. In FIG. 1, for the sake of simplicity, a payload comprising two reception channels has been represented, but the number of channels is in general bigger.

Each processing channel comprises an analogue radiofrequency chain $RF_1$, $RF_2$ which consists of one or more filter(s), of one or more amplifier(s) and optionally of one or more mixer(s) for carrying out a frequency transposition of the signal received.

At the output of each analogue radiofrequency reception chain, an analogue-to-digital converter $ADC_1$, $ADC_2$ is positioned so as to convert the analogue signals into digital signals which are provided to a set of digital integrated circuits PN. Each digital integrated circuit is, for example, an integrated circuit specific to an application (also known by the English acronym ASIC for "Application-Specific Integrated Circuit") or an array of in situ programmable gates (also known by the English acronym FPGA for "Field-Programmable Gate Array") or a set of logic gates or else a signal processor or a generic processor.

The set of digital integrated circuits PN comprises, for example, one digital filter per processing channel and a beamforming circuit FFC carrying out a beamforming function common to a set of the processing channels. The function of the beamforming circuit FFC is notably to linearly combine the signals received with a particular set of complex gains (amplitude and phase) to form a beam in the desired direction, in relation to a reference frame of the antenna, so as to receive the useful signals. The particular combination of the signals received with complex gains constitutes a law of combination or a beam-forming law.

The example of FIG. 1 is given purely by way of nonlimiting illustration. In particular, the set of digital integrated circuits can exhibit a modular architecture different from that of FIG. 1. For example, it can comprise several series of digital integrated circuits for each channel or several beamforming integrated circuits operating in parallel and in cascade for sub-groups of channels.

In all architecture cases, the set of digital integrated circuits comprises a means MEM, for example a memory, for capturing or recording, in a coherent manner over one and the same time interval, the digital signals of a set of the channels, for example at the output of the analogue-to-digital converters $ADC_1$, $ADC_2$. In one embodiment of the invention, the set of digital integrated circuits PN furthermore comprises a device EST for estimating the pointing error of the antenna ANT on the basis of the digital signals captured by the memory MEM. This device EST is embodied, for example, by means of a computer that is installed on board and includes software elements and/or hardware elements. In another embodiment of the invention, the device EST for estimating the pointing error is located in a ground station $ST_1$, $ST_2$ or in some other equipment on the ground.

The method according to the invention starts with the dispatching 201 of at least two test signals by at least two ground stations, in two different directions of arrival $\theta_A$, $\theta_B$. Without departing from the scope of the invention, more than two ground stations can be used, each transmitting a test signal towards the satellite from a different direction. The directions of arrival must be different from the viewpoint of the satellite. To satisfy this constraint, the ground stations are, for example, situated in different spots. A spot corresponds to a beam of the multibeam antenna coverage.

The test signals are narrowband signals which consist, for example, of a spectral line at a given frequency making it possible to not interfere with the useful signals. The test signals can also consist of carriers modulated by another predetermined signal. The ground stations $ST_1$, $ST_2$ transmit in turn on one and the same frequency or simultaneously on frequencies which are different but which are sufficiently close to be affected in the same manner by the propagation, the RF chains and the antenna. The test signals are known beforehand to the satellite and to the ground stations.

The signals received by the satellite are processed on board by the radiofrequency chains $RF_1$, $RF_2$ of each channel and are then digitized by the converters $ADC_1$, $ADC_2$.

In a second step 202 of the method according to the invention, the digitized signals are acquired in a coherent manner over one and the same time interval for at least two distinct channels. For example, the signals are tapped off directly at the output of the analogue-to-digital converters of two channels or somewhere else in the set of digital integrated circuits, the only constraint being that the signals corresponding to two distinct channels be able to be tapped off simultaneously.

On the basis of the signals digitized simultaneously on at least two distinct channels and for at least two test signals received in two different directions of arrival, the following steps of the method according to the invention are aimed at determining an estimate of the pointing error of the antenna. These steps can be carried out on board the satellite in the set of digital integrated circuits PN or by a computer which is installed on board or on the ground in one of the ground stations $ST_1$, $ST_2$ used for the transmission of a test signal or in some other equipment. FIG. 1 shows diagrammatically the case where the computation of the pointing error is carried out by an estimation device EST which is implemented in the set of digital integrated circuits PN.

For each of the at least two channels, a step of digital filtering of the signal around the useful carrier of the test signal makes it possible to recover precisely the spectral line transmitted by the ground stations.

Thereafter, in a step 203, for each test signal received corresponding to the transmissions by the two ground stations $ST_1$, $ST_2$, a relative complex gain between two reception channels of the payload is determined. The relative complex gain is determined by performing an intercorrelation computation between the digital signal of the first channel and the digital signal of the second channel. Indeed, the calibration signal being propagated identically on each channel, the result of the intercorrelation of the signals makes it possible to obtain a relative gain which contains the relative gain and the relative phase between the two processing channels. The intercorrelation computation is, for example, carried out either directly in the time domain by correlation computation, or indirectly in the frequency domain by means of two direct Fourier transforms, of a complex conjugation, of a complex multiplication and of an indirect Fourier transform, according to techniques known to the person skilled in the art.

Let dθ be the pointing error of the antenna ANT.

For the ground station $ST_1$, seen by the antenna ANT in the direction $\theta_A+d\theta$, a first measurement of relative complex gain, for a frequency f of the test signal, is thus carried out:

$$Mes_A(\rho_{k,1}) = \rho_{k,1}(Antenna_{f,\theta_A+d\theta}) * \rho_{k,1}(RF_f) * \rho_{k,1}(DAC) \quad \text{[Math. 1]}$$

For the ground station $ST_2$, seen by the antenna ANT in the direction $\theta_B+d\theta$, a second measurement of relative complex gain, for a frequency f of the test signal, is thus carried out:

$$Mes_B(\rho_{k,1}) = \rho_{k,1}(Antenna_{f,\theta_B+d\theta}) * \rho_{k,1}(RF_f) * \rho_{k,1}(DAC) \quad \text{[Math. 2]}$$

Each measurement of relative complex gain corresponds to the product of several terms. The terms $\rho_{k,1}(Antenna_{f,\theta_A+d\theta})$ and $\rho_{k,1}(Antenna_{f,\theta_B+d\theta})$ correspond to the gain of the antenna in the respective directions $\theta_A+d\theta$ and $\theta_B+d\theta$, for the frequency f.

The terms $\rho_{k,1}(RF_f)$ and $\rho_{k,1}(DAC)$ correspond respectively to the gain ratios between the two channels, related to the differences in behaviour of the radiofrequency chains for the frequency f and of the analogue-digital converters of these two channels. These terms are common to the two measurements.

In a following step 204, the ratio between the two measurements of relative gain that were determined in step 203 is determined.

$$RMes_{B/A}, k, 1 = \frac{\rho_{k,1}(Antenna_{f,\theta_B+d\theta})}{\rho_{k,1}(Antenna_{f,\theta_A+d\theta})} \quad \text{[Math. 3]}$$

By computing this ratio, the terms which are common to the two measurements offset one another and only the contributions related to the gain of the antenna are retained.

In another step 205, the ratio computed in step 204 is thereafter compared with a model of the gain of the antenna dependent on the direction of arrival of the signal and on the frequency. On the basis of this model, of the ratio computed in step 204 and of the values of the expected directions of arrival of the test signals, an estimate of the pointing error dθ is deduced therefrom.

The directions of arrival $\theta_A$, $\theta_B$ are determined on the basis of the known positions of the ground stations $ST_1$, $ST_2$ and of the satellite, and of the reference frame of the antenna of the satellite.

A possible procedure for determining the pointing error dθ consists in searching for the value of dθ which makes it possible to minimize the error between the aforementioned ratio determined in step 204 and the ratio of the antenna gains which were determined on the basis of the model for the respective directions $\theta_A+d\theta$ and $\theta_B+d\theta$. Any suitable numerical solution procedure makes it possible to determine an estimate of the value of dθ.

In a last step 206, the estimated pointing error is used to correct the pointing of the antenna either mechanically, or by adapting the beamforming laws to integrate the estimated mispointing dθ.

In a variant embodiment of the method according to the invention, several estimates of the pointing error dθ are determined.

For example, more than two ground stations can be used, in this case, several ratios of relative gains are computed for various pairs of test signals received along different directions of arrival.

Another solution consists in utilizing more than two reception channels in the payload. In this case, several ratios of relative gains are computed for various pairs of reception channels.

Finally, several test signals can be transmitted sequentially on different frequencies. In this case, several ratios of relative gains are computed for various frequencies.

The three variants described hereinabove can be combined together (several ground stations, several reception channels and several frequencies).

An advantage in using several estimates of the pointing error is that this makes it possible to lift potential ambiguities, for example if several values of the error dθ satisfy equality between the ratio of gain measurements and the ratio of the gain values which were determined on the basis of the antenna gain model.

In another variant embodiment of the method according to the invention, only the phase or only the amplitude of the relative complex gains are utilized. In this case, the ratio of complex gains which was computed in step 204 is replaced with a ratio of amplitudes or with a difference of phases.

Figure 3:
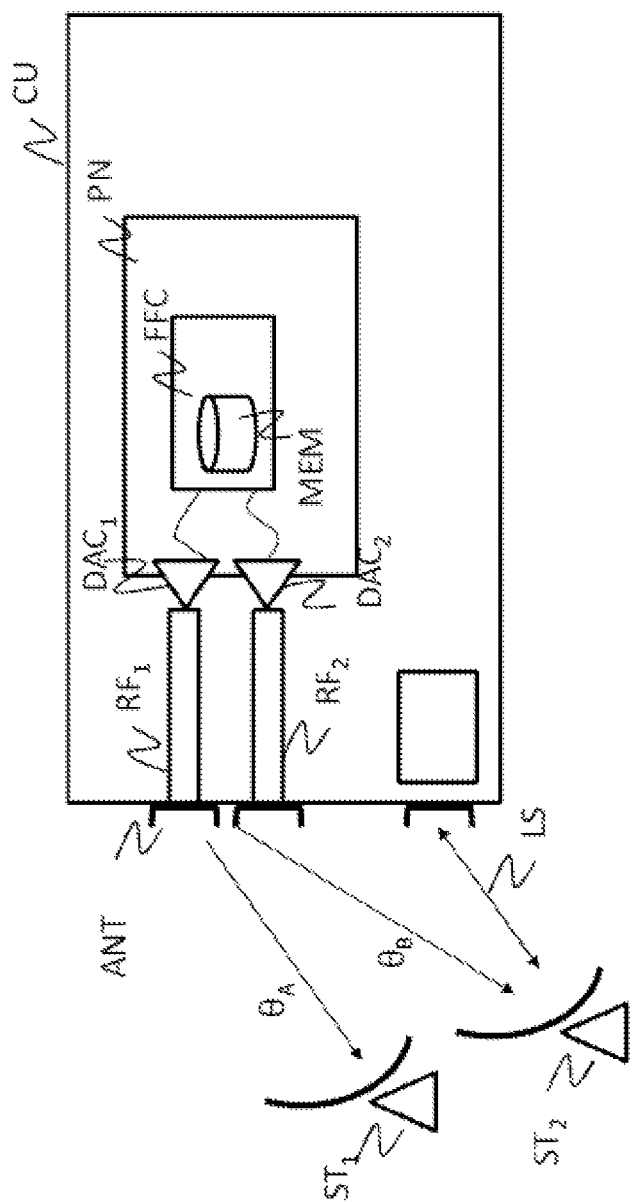
FIG. 3 represents a diagram of a system for estimating a pointing error of an antenna of a satellite operating in transmission mode according to a second embodiment of the invention.
Figure 4:
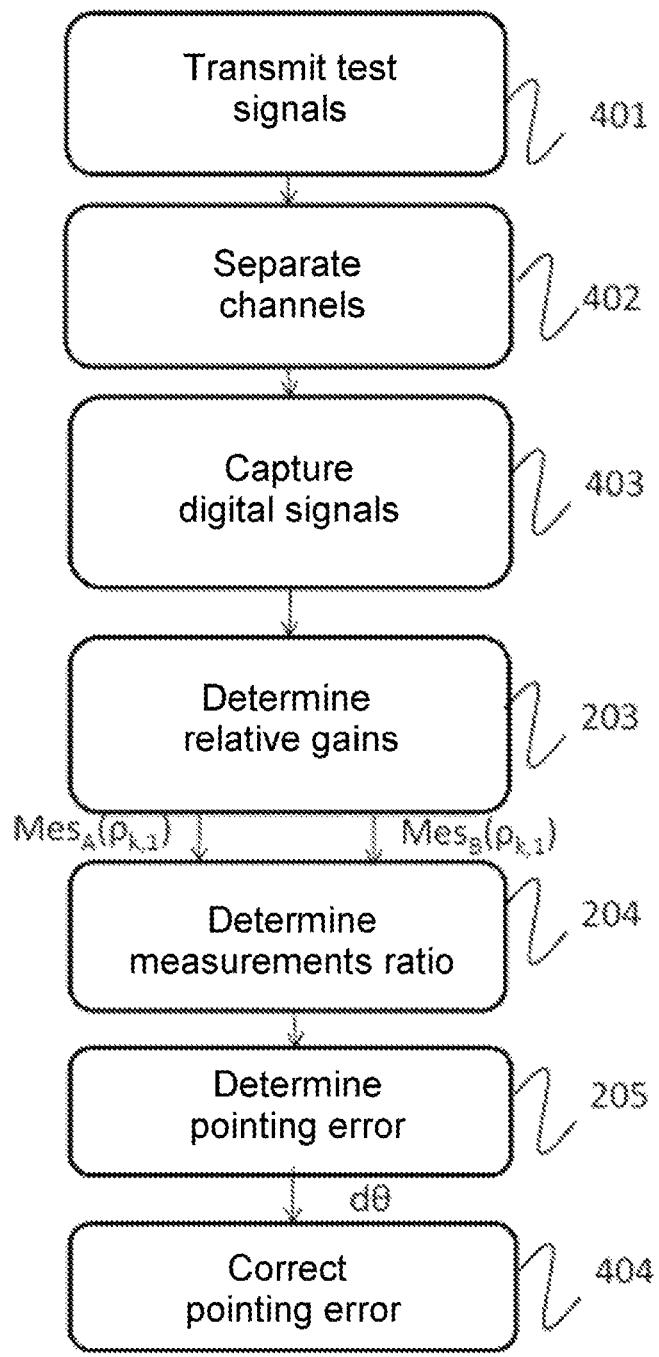
FIG. 4 represents a flowchart detailing the steps of carrying out a method for estimating a pointing error with the aid of the system of FIG. 3.

FIGS. 3 and 4 describe another variant embodiment of the invention applied to an antenna in transmission mode.

FIG. 3 represents a payload CU of a satellite in orbit comprising an antenna ANT operating in transmission mode. The payload CU comprises a set of digital integrated circuits PN carrying out a beamforming function in transmission mode on N channels, digital-to-analogue converters at the output of each channel, RF transmission chains connected between the outputs of the digital-to-analogue converters and one or more antenna(s) ANT or antenna array consisting of several radiating elements. Each processing channel in transmission mode comprises an analogue radiofrequency chain $RF_1$, $RF_2$ which consists of one or more filter(s), of one or more amplifier(s) and optionally of one or more mixer(s) for carrying out a frequency transposition of the signal. Each radiating element is associated with a transmission channel. The payload CU thus exhibits multi-channel operation. In FIG. 3, a payload comprising two transmission channels has been represented, but the number of channels is in general bigger.

FIG. 4 details, on a flowchart, the steps of carrying out a method for estimating and correcting the pointing error of the antenna ANT.

In a first step 401, a test signal, similar to that described previously, is generated in the set of digital integrated circuits PN. For example, it can be stored digitally in a memory MEM and then dispatched to the digital-to-analogue converters $DAC_1$, $DAC_2$ of each processing channel.

To be able to separate the transmission channels when the test signal is received on the ground, a multiple access technique is used to transmit the test signal on the various transmission channels. The access technique is, for example, a spreading code division multiple access technique (of CDMA type), in this case the digital test signal generated is spread with a different spreading code for each transmission channel. Another possible access technique is a frequency division multiple access technique (of FDMA type) which consists in modulating the test signal on a different frequency for each transmission channel. The digital signals can be precomputed and stored in a memory or a register MEM.

The test signal is thus dispatched on a set of the transmission channels of the antenna ANT to at least two ground stations $ST_1$, $ST_2$ in two different directions $\theta_A$, $\theta_B$.

In each of the ground stations $ST_1$, $ST_2$, the signals are separated 402 by transmission channels as a function of the access technique (for example of CDMA, FDMA or other type) used and are then digitized 403.

Thereafter, steps 203, 204, 205 described in FIG. 2 are applied identically to determine an estimate of the pointing error of the antenna ANT.

The computation of the estimate of the pointing error is carried out either in one of the ground stations $ST_1$, $ST_2$, or in ground equipment which may or may not be connected to the ground stations $ST_1$, $ST_2$.

The pointing error is thereafter dispatched 404 to the satellite via a secure link LS for correction of the pointing of the antenna.

The invention claimed is:

1. A system for estimating a pointing error of an antenna (ANT) of a satellite, the satellite comprising a payload (CU) comprising a multichannel transmitter or receiver comprising a multichannel antenna (ANT), one analogue processing chain per channel and a set of digital integrated circuits (PN), the system comprising an estimation device (EST), implemented aboard the satellite or in a ground station, for estimating a pointing error of the antenna, the device for estimating a pointing error being configured to:
   acquire, for at least two channels of the transmitter or of the receiver, at least two test signals, each test signal having been transmitted or received by the antenna along a different direction ($\theta_A$, $\theta_B$) from the viewpoint of the satellite,
   for at least one pair of acquired test signals, determine, for each test signal, a relative complex gain between the test signal received or transmitted respectively on two distinct channels,
   determine a comparative measurement between the two test signals from either the ratio between the two relative complex gains and/or the difference between the phases of the two relative complex gains,
   determine a pointing error (d$\theta$) of the antenna on the basis of the comparative measurement, of the expected directions of transmission or of reception of the test signals ($\theta_A$, $\theta_B$) and of a model of the gain of the antenna for each channel and in a plurality of directions.

2. The system for estimating a pointing error of an antenna according to claim 1, wherein each test signal is composed of at least one spectral line.

3. The system for estimating a pointing error of an antenna according to claim 1, wherein the estimation device (EST) for estimating a pointing error is configured to determine a plurality of estimates of a pointing error on the basis of several pairs of test signals transmitted or received in different directions or several different pairs of distinct channels or several frequencies of test signals.

4. The system for estimating a pointing error of an antenna according to claim 1, wherein the estimation device (EST) for estimating a pointing error is configured to determine a pointing error of the antenna by:
   determining, on the basis of the model of the gain of the antenna, a model of comparative measurement between the two test signals, dependent on a pointing error of the antenna, on the frequency and on the expected directions of transmission or of reception of the test signals ($\theta_A$, $\theta_B$),
   searching for the value of the pointing error which makes it possible to minimize the difference between the comparative measurement and the comparative measurement model taken at this value.

5. The system for estimating a pointing error of an antenna of a satellite according to claim 1, wherein the payload (CU) comprises a multichannel receiver and the estimation device (EST) for estimating a pointing error is configured to receive, for at least two reception channels, a digitized temporal sample sequence of at least two test signals, the temporal sample sequence being acquired simultaneously from the various channels in the set of digital integrated circuits (PN).

6. The system for estimating a pointing error of an antenna of a satellite according to claim 5, furthermore comprising at least two test ground stations ($ST_1$, $ST_2$), each test ground station being configured to transmit a test signal towards the satellite.

7. The system for estimating a pointing error of an antenna of a satellite according to claim 5, wherein each test ground station is configured to transmit the test signals in turn on one and the same frequency or simultaneously on distinct frequencies which are sufficiently close to be affected by the same errors.

8. The system for estimating a pointing error of an antenna of a satellite according to claim 1, wherein the payload comprises a multichannel transmitter, the estimation device (EST) for estimating a pointing error being implemented in a ground station, each test signal received by a different ground station being transmitted by the antenna along a different direction of transmission ($\theta_A$, $\theta_B$) from the viewpoint of the satellite.

9. The system for estimating a pointing error of an antenna of a satellite according to claim 8, furthermore comprising at least two test ground stations ($ST_1$, $ST_2$), each test ground station being configured to:
   receive a test signal transmitted by the satellite along a different direction from the viewpoint of the satellite,
   separate the test signal received on the ground into several signals corresponding to the respective transmission channels of the satellite,
   dispatch, to the device for estimating a pointing error, the respective test signals received for at least two distinct transmission channels.

10. The system for estimating a pointing error of an antenna of a satellite according to claim 8, wherein the system is configured to apply a procedure for multiple access to the test signals transmitted by the satellite.

11. A method for estimating a pointing error of an antenna of a satellite, the satellite comprising a payload comprising a multichannel transmitter or receiver comprising a multichannel antenna, one analogue processing chain per channel and a set of digital integrated circuits, the method comprising the steps of:
   acquiring, for at least two channels of the transmitter or of the receiver, at least two test signals, each test signal having been transmitted or received by the antenna along a different direction ($\theta_A$, $\theta_B$) from the viewpoint of the satellite,
   for at least one pair of acquired test signals, determining, for each test signal, a relative complex gain between the test signal received or transmitted respectively on two distinct channels,
   determining a comparative measurement between the two test signals from either the ratio between the two relative complex gains and/or the difference between the phases of the two relative complex gains,
   determining a pointing error (d$\theta$) of the antenna on the basis of the comparative measurement, of the expected directions of transmission or of reception of the test signals and of a model of the gain of the antenna for each channel and in a plurality of directions.

12. The method for estimating a pointing error of an antenna of a satellite according to claim 11, furthermore comprising a step of correcting the pointing of the antenna (ANT) on the basis of the pointing error (dθ).

* * * * *